United States Patent Office 3,134,732
Patented May 26, 1964

3,134,732
REACTIVATION OF REGENERATED NOBLE METAL CATALYSTS WITH GASEOUS HALOGENS
Kenneth K. Kearby, Cranford, John P. Thorn, Elizabeth, and John A. Hinlicky, Irvington, N.J., assignors to Esso Research and Engineering Company, a corporation of Delaware
No Drawing. Filed July 17, 1953, Ser. No. 368,818
19 Claims. (Cl. 208—140)

The present invention relates to improvements in catalyst reactivation. More particularly, it relates to improvements in the reactivation of noble metal type catalysts which have deactivated so as to be unusable or which have suffered a distinct loss of activity in the processes for which their utility is indicated. Still more particularly, this invention relates to the reactivation of metal oxide supported platinum catalysts utilized in hydroforming processes through the utilization of gaseous halogen, particularly chlorine.

It is a matter of record and commercial practice to hydroform naphthas in the presence of a platinum catalyst. This platinum catalyst is usually supported on a suitable base, such as alumina, and may also contain a small amount of promoters or stabilizers such as boria, phosphoric acid, silica, halides or organic acids. For instance, a commonly used composition of such catalyst is one containing from 0.01 to 2.0 weight percent platinum, the remainder being the alumina spacing agent or base. In place of alumina, other bases having mild cracking activity are used. In this hydroforming operation, virgin naphthenic naphtha is contacted at elevated temperatures and pressures with the catalyst in the presence of added hydrogen. The function of the hydrogen is to repress the formation of carbonaceous deposits on the catalyst.

The operating conditions of the hydroforming operation are pressures in the range of 50 to 1000 p.s.i.g., usually 200 to 700 p.s.i.g., and temperatures in the range of 750°–1050° F., usually 875–950° F. The hydrogen dilution can vary from about 1000 to 10,000 c.f./b.

The feed or charging stock to the hydroforming reactor can be a virgin naphtha, a cracked naphtha, a Fischer-Tropsch naphtha, or the like, and mixtures thereof. The feed stock is preheated alone or in admixture with recycle gas to reaction temperature or to the maximum temperature possible while avoiding thermal degradation of the feed stock.

These platinum catalysts have been found to deactivate with usage for various reasons, among which are changes in the physical state of the platinum. Important factors in the latter, for example, are the increased size of the platinum crystals and the rate of platinum crystal growth. Contaminants such as other heavy metals also tend to deactivate the catalyst. The deactivation resulting from these factors should be distinguished from the simpler, more easily reversible, loss of activity of the catalyst due to carbonization from the reaction or diminution in hydrocracking activity due to loss of halide which can be restored by halide addition.

Changes in the platinum crystal lattice also account to a certain extent for catalyst deactivation. Although these changes are reversible under certain conditions of operation, the severe treatment required to alter the lattice eventually leads to an agglomeration of platinum crystallites which in the past has been considered an irreversible process. Normally, therefore, "spent" platinum catalysts are processed for the extraction, separation and recovery of the platinum which is then used to prepare fresh catalyst. This is, of course, an expensive operation, because of platinum recovery charges and cost for manufacturing new catalysts.

It has now been found that this expensive recovery operation can be completely eliminated by the reactivation process of this invention. The process of this invention comprises oxidizing deactivated, carbonized catalysts in pill, granular, or powdered form to remove carbonaceous deposits therefrom, treating the decarbonized catalyst with a halogen-containing gas, and stripping excess halogen from the catalyst. The thus treated catalyst is then subjected to a reduction step, preferably with a hydrogen-containing gas, in either a separate treating zone or directly in the reaction zone. This process completely reactivates the deactivated catalyst so that it is again usable.

It is surprising to learn that gaseous halogens accomplish this effect, because gaseous hydrogen halide acids do not have the same effect on deactivated catalysts. Conversely, experimental data demonstrate that this reactivation is more than a so-called restoration of halogen content to the catalyst. The halogen content of the reactivated catalyst can be reduced to a level below the deactivated catalyst, but its activity remains markedly improved.

The noble metals for treatment in accordance with the present invention include platinum, palladium, gold, silver, iridium, rhodium, ruthenium, osmium, etc. These noble metals are generally associated and supported on a metal oxide and particularly an oxide of a metal in the left hand columns of groups III to VIII of the periodic table including particularly the oxides of silicon, aluminum, titanium, zirconium, hafnium, thorium, vanadium, tantalum, chromium, molybdenum, tungsten, uranium, manganese, zinc, cobalt, nickel, etc. It is understood that the catalyst can comprise two or more noble metals and/or two or more metal oxides. In still other cases, one or more activating components may be included in the catalyst. Particularly suitable is the platinum on alumina catalyst.

The carbonaceous deposits are first removed from the catalyst by oxidation, e.g., burning in air or an oxygen-containing gas at a temperature of from about 700° F. to about 1100° F., for a period of from about 1 to 12 hours or more. The carbonized catalyst can first be burned with dilute air, e.g., 1–2 mole percent $O_2$, at temperatures of about 900° F. In an advantageous modification the temperature is then raised to 1100° F. at higher $O_2$ pressures, e.g., 20 lbs. $O_2$ or air at 200 lbs.

Various gaseous halogens can be utilized, i.e., chlorine, fluorine, and bromine. Chlorine is particularly preferred because of efficiency, cost, safety, and corrosion factors.

The chlorine-containing gases can be mixed with either oxygen-containing gases such as air or inert gases such as nitrogen, carbon dioxide, flue gas, etc.

The amount of chlorine utilized is in the range of 0.1 to 10 weight percent on catalyst, and preferably 1 to 3 weight percent on catalyst. The partial pressure of the chlorine gas can range from 0.1 to 100% of the total pressure within the foregoing limits. All other things being equal, the higher the partial pressure, the more rapid the effect.

The temperature of halogen treatment utilized is in the range of ambient temperature, i.e. 60° F. to 1250° F., and preferably 800°–1000° F. To effect economies in heat input the catalyst will generally be treated at temperatures prevailing in the unit. The preferred time interval of treatment is in the range of several minutes, but, as will be understood by those skilled in the art, the treating time can be varied to obtain the desired degree of reactivation.

The halogen is added to the catalyst in any of a number of ways, being controlled in accordance with the treating time in such a way that the desired quantity of halogen is retained by the catalyst. For a typical catalyst consisting of 0.6% platinum on an alumina derived from the hydrolysis of aluminum alcoholate, the chlorine retained by the base is about 2 weight percent. In a fluid catalyst unit this presents no problem, but in a fixed bed unit it is necessary to insure that the added halogen is uniformly distributed throughout the catalyst bed and not completely adsorbed by a small fraction of the bed. In order to get uniform halogen distribution, it is important to use a high space velocity during halogen treatment. Advantage can also be taken of such methods as alternating the direction of flow or introducing the halogen at a multiplicity of points through the bed.

The excess of chlorine is then stripped with commonly available stripping gas such as hydrogen, nitrogen, flue gas, air, etc., or certain combinations thereof. The chloride content of the stripped catalyst is preferably 0.01 to 0.5 weight percent on catalyst.

The final step in the activation involves the subjection of the catalyst to a reduction step where required. This reducing step can be carried out by means known in the art, such as hydrogenation or calcination. Typical of these reduction operations is treatment with hydrogen at 400°–1000° F. with hydrogenation pressures of atmospheric to 1000 pounds p.s.i.g. Calcining can be carried out at temperatures of the order of about 700°–1200° F. Actually, as stated before, it is preferable to carry out the reduction directly in the process wherein the catalyst is to be utilized, e.g., with hydrogen or hydrocarbon feed in the hydroforming process.

The utilization of hydrogen as a stripping gas results, of course, in a combination of the stripping and reduction steps.

This invention will be better understood by reference to the following examples of the reactivation of a deactivated platinum catalyst.

*Example I*

A catalyst consisting of 0.6 weight percent Pt on an activated alumina prepared by the hydrolysis of aluminum alcoholate was tested at 900° F., 200 p.s.i.g., 2 w.hr./w. and 6 to 1 hydrogen to hydrocarbon dilution mole ratio feeding a 200°–330° F. Coastal virgin naphtha. This catalyst contained 0.23% residual chloride from the chloroplatinic acid used in the preparation of the composite. Under these testing conditions a $C_5+$ hydroformate of 96.2 research clear octane number was obtained. After aging, the activity of this catalyst had declined to the point where only 75.3 research clear octane product was being obtained under the same testing conditions. Examination of the deactivated catalyst by X-ray diffraction indicated that the platinum crystal size had increased to 200+ A., whereas the crystallite size of the active fresh catalyst was less than 50 A. The chloride content of the deactivated catalyst was 0.19 weight percent.

739 grams of the deactivated catalyst were contacted with 52.9 grams (7.2 weight percent on catalyst) of chlorine in a flow system at 900° F. and one atmosphere pressure for three hours. The catalyst was then calcined in air for one hour at 1100° F. and reduced in hydrogen for sixteen hours at 900° F. The thus treated catalyst was then tested under the conditions outlined above and the product obtained had a research clear octane number of 94.0. The reactivated catalyst after only two hours' use was found to contain 0.13 weight percent chloride and the platinum crystal size was less than 50 A.

These data demonstrate that the small platinum crystal size and its activity were essentially completely restored by the reactivation treatment of this invention. It should be particularly noted that the chloride content of the reactivated catalyst (0.13%) was less than that of the deactivated catalyst (0.19%), indicating that this reactivation is not due to a simple halide restoration treatment.

*Example II*

In an additional experiment a 759 gram sample of the deactivated catalyst was contacted with 0.43 cubic foot (3.9 weight percent) of chlorine at 900° F. and one atmosphere for two hours. The catalyst was then heated in air at 1100° F. for one hour. The chloride content of this catalyst was 1.11 weight percent after this treatment. The halide content was then reduced by washing with 2 volumes of 10% aqueous ammonium nitrate solution. This catalyst after washing, drying, and reduction with hydrogen contained less than 0.01% chloride. The platinum crystallite size was less than 50 A. Upon testing under the conditions outlined above this catalyst produced a hydroformate of 95.9 research clear octane.

While it is not intended that the process of this invention be restricted to any proposed mechanism of operation, it is apparent that the chlorine reactivation treatment brings about a redistribution of the platinum crystallites resulting in an increase in the specific platinum surface area and thus the activity of the catalyst. Among other reasons for this reactivation are the removal of contaminants such as sulfur, metal poisons such as arsenic, and carbon by the formation of volatile compounds.

The reactivated platinum type catalysts of this invention are adapted for use in hydroforming, hydrogenation, oxidation, and other reactions known to those in the art.

Numerous advantages of the process of this invention are apparent. An extremely large saving results from reactivating the catalyst directly without dissolving away of the platinum from the support or destruction of the expensive support material. Another advantage is that the reactivation process of this invention, because of its flexibility of operation, can be incorporated directly into some of the operations for which the catalysts are utilized. For example, the reactivation treatment can be incorporated into a process for hydroforming with platinum-alumina catalysts carried out in fixed, fluid, or moving bed.

In certain circumstances it can be desirable to insert another hydrogen reduction step between the regeneration and the halogenating steps. This can have the advantage of removing loosely bound oxygen and water from the catalyst and consequent savings in halogenating agent.

It is also not necessary that the treatment of this invention be applied to a completely deactivated catalyst, as it can be desirable to utilize relatively short cycles in order to keep the catalyst operating at peak activity.

The process of this invention also has utility in improving and preparing fresh catalyst and removing contaminants.

It is to be understood, therefore, that this invention is not limited to the specific examples, which have been offered merely as illustrations, and that modifications may be made without departing from the spirit of the invention.

What is claimed is:

1. In a process for hydroforming petroleum fractions with an alumina-supported platinum catalyst which has declined in activity during the process and contains carbonaceous deposits, the improvement which comprises the steps of treating with an oxygen containing gas the deactivated catalyst at elevated temperatures to burn the carbonaceous deposits therefrom; contacting the catalyst with gaseous halogen in an amount of from 0.1 to 10 weight percent based on the supported catalyst at a maximum temperature of 1250° F. to bring about a reduction in the size of the platinum crystallites; reducing the thus treated catalyst, whereby it is reactivated; and reutilizing the reactivated catalyst in the hydroforming process.

2. The process of claim 1 in which the reducing step is in the presence of hydrogen at a temperature in the range of 400°–1000° F.

3. In a process for the catalytic conversion of hydrocarbons wherein a stream comprising a mixture of hydrogen and hydrocarbons to be converted is passed through a conversion zone containing a body of catalyst comprising a major portion of alumina and a minor portion of less than 2% platinum at conversion temperatures and wherein the activity of said catalyst declines because of the formation of carbonaceous deposits and the agglomeration of platinum crystallites; the method of restoring the activity of said catalyst which comprises periodically interrupting the flow of said hydrocarbons and hydrogen through said conversion zone, passing a free oxygen containing gas through said conversion zone under conditions controlled to burn the carbonaceous deposits from said catalyst while maintaining the temperature of said zone between 700° F. and 1100° F., thereafter passing a treating gas providing halogen through said conversion zone and continuing said treatment until the amount of halogen contacting said catalyst is between 1 and 10% by weight of said catalyst and sufficient to effect a reduction in the size of platinum crystallites, maintaining the temperature during said treatment between about 800° and 1000° F., thereafter treating said body of catalyst with hydrogen to purge the treating gas therefrom and thereafter flowing a further stream of said hydrocarbons and hydrogen through said conversion zone.

4. In the process of claim 3 the further improvement which comprises carrying out the halogen treatment in the presence of an oxidizing gas.

5. In the process of claim 3 the further improvement wherein the halogen in said treating gas is gaseous chlorine.

6. A method of reactivating a hydrocarbon conversion catalyst comprising alumina having platinum thinly dispersed thereon to form an extended platinum surface area, said catalyst having declined in activity due to the formation of combustible deposits which method comprises burning combustible deposits from the catalyst whereby the surface area of the platinum is reduced, thereafter treating the catalyst with a gas providing halogen at elevated temperatures in an amount and for a period sufficient to increase materially the specific platinum surface area and activity of said catalyst.

7. The process defined in claim 6 wherein said gas provides chlorine.

8. The method defined in claim 6 wherein said gas provides chlorine in admixture with oxygen and the elevated temperature is between about 800° and 1000° F.

9. In a hydrocarbon conversion process wherein a mixture of hydrocarbons and hydrogen is passed through a conversion zone maintained at conversion temperature and pressure for a period sufficient to effect the desired conversion, said conversion zone containing a body of catalyst comprising alumina having platinum thinly dispersed thereon to present an extended platinum surface area and wherein the catalyst is periodically regenerated to burn combustible deposits formed during the conversion treatment and wherein the surface area of the platinum is substantially reduced during such treatment; the method of restoring surface area of said platinum which comprises treating the regenerated catalyst while at elevated temperature and before contacting the same with further hydrocarbon feed with a gas providing halogen in an amount and for a period sufficient to restore platinum surface area and activity of said catalyst.

10. The process defined in claim 9 in which the treating gas provides chlorine in admixture with oxygen and the amount of chlorine is between 0.1 and 10 weight percent based on the catalyst and the treating temperature is between 800 and 1000° F.

11. In a hydroforming process wherein a mixture of hydrocarbons in the gasoline boiling range and hydrogen is passed through a hydroforming zone maintained at a conversion temperature of from 750° to 1050° F. and at a pressure from 50 to 1000 pounds per square inch for a period sufficient to obtain the desired hydroforming treatment, said hydroforming zone containing a stationary bed of catalyst comprising alumina having platinum in an amount between .01 and 2% thinly dispersed on said alumina to present an extended platinum surface area and wherein the catalyst is periodically regenerated to burn combustible deposits formed during the conversion treatment and wherein surface area of the platinum is substantially reduced during such treatment; the method of maintaining the activity of said catalyst which comprises treating the regenerated catalyst with a gas providing halogen for a period sufficient to increase materially the platinum surface area and activity of the catalyst and thereafter continuing the conversion process.

12. The process defined in claim 11 wherein said gas provides chlorine.

13. The process defined in claim 11 wherein said gas provides chlorine in admixture with oxygen.

14. The process defined in claim 11 wherein the halogen treated catalyst is contacted with hydrogen before continuing the conversion process.

15. The process defined in claim 14 wherein the halogen treated catalyst is further treated with an oxygen containing gas at elevated temperature before contacting with said hydrogen.

16. A process for reactivating a hydrocarbon conversion catalyst comprising platinum and alumina, said catalyst having declined in activity due to the formation of combustible deposits, which comprises burning combustible deposits from the catalyst and thereafter treating the catalyst with chlorine at a temperature of from 800° to 1000° F. for a period sufficient to reactivate the catalyst.

17. A method for reactivating a platinum-alumina catalyst after deactivation thereof by contact with a petroleum naphtha under hydroforming conditions, which comprises burning carbon from said catalyst and contacting said catalyst with a gaseous mixture of oxygen and chlorine at a temperature between about 800–1000° F. for a period sufficient to reactivate the catalyst.

18. A method of reactivating an alumina supported platinum hydroforming catalyst which has become deactivated in use which comprises discontinuing the contact of the deactivated catalyst with the naphtha feedstock and reactivating the deactivated catalyst by contacting it with gaseous chlorine at a temperature of 800–1100° F. for a period of time sufficient to substantially reduce the size of and redisperse the platinum crystallites, reducing the treated catalyst by contact with hydrogen at an elevated temperature and then reutilizing the reactivated catalyst in the hydroforming reaction.

19. A method of reactivating an alumina supported platinum hydroforming catalyst which has become deactivated in use which comprises discontinuing the contact of the deactivated catalyst with the naphtha feedstock and reactivating the deactivated catalyst by burning carbon from the catalyst, contacting the catalyst with a gas providing halogen at an elevated temperature for a period of time sufficient to substantially reduce the size of and redisperse the platinum crystallites and then reutilizing the reactivated catalyst in the hydroforming reaction.

References Cited in the file of this patent

UNITED STATES PATENTS

| | | |
|---|---|---|
| 2,479,110 | Haensel | Aug. 16, 1949 |
| 2,488,744 | Snyder | Nov. 22, 1949 |
| 2,635,080 | Appell | Apr. 14, 1953 |
| 2,642,384 | Cox | June 16, 1953 |
| 2,651,599 | Watts et al. | Sept. 8, 1953 |
| 2,746,909 | Hemminger | May 22, 1956 |

FOREIGN PATENTS

| | | |
|---|---|---|
| 511,278 | Belgium | May 31, 1952 |